(12) United States Patent
Huang et al.

(10) Patent No.: US 11,971,630 B1
(45) Date of Patent: Apr. 30, 2024

(54) LIQUID CRYSTAL DISPLAY PANELS AND METHODS OF MANUFACTURING THE SAME

(71) Applicant: SUZHOU CHINA STAR OPTOELECTRONICS TECHNOLOGY CO., LTD., Jiangsu (CN)

(72) Inventors: Lingju Huang, Jiangsu (CN); Hongjun Zhu, Jiangsu (CN)

(73) Assignee: SUZHOU CHINA STAR OPTOELECTRONICS TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/175,558

(22) Filed: Feb. 28, 2023

(30) Foreign Application Priority Data

Feb. 10, 2023 (CN) .......................... 202310097070.2

(51) Int. Cl.
*G02F 1/1339* (2006.01)
(52) U.S. Cl.
CPC .................................. *G02F 1/1339* (2013.01)
(58) Field of Classification Search
CPC . G02F 1/1339; G02F 1/1341; G02F 1/133351
USPC .......................................................... 349/153
See application file for complete search history.

(56) References Cited

U.S. PATENT DOCUMENTS

| | | | | |
|---|---|---|---|---|
| 2001/0012088 A1* | 8/2001 | Jeong | ..................... | G02F 1/1339 349/190 |
| 2003/0160935 A1* | 8/2003 | Lee | ......................... | G02F 1/1341 349/187 |
| 2007/0195255 A1* | 8/2007 | Cho | ....................... | G02F 1/1339 349/153 |
| 2012/0327355 A1* | 12/2012 | Cheng | ................... | G02F 1/1341 349/153 |
| 2018/0356663 A1* | 12/2018 | Zhang | ............... | G02F 1/136286 |
| 2021/0356781 A1* | 11/2021 | Wang | ................ | G02F 1/133305 |

* cited by examiner

*Primary Examiner* — Edward J Glick
*Assistant Examiner* — David Y Chung
(74) *Attorney, Agent, or Firm* — PV IP PC; Wei Te Chung; Zhigang Ma

(57) ABSTRACT

The present disclosure provide methods of manufacturing a liquid crystal display panel and the liquid crystal display panels. In a process of forming a motherboard of the display panel, a second sealant portion and a third sealant portion with a lower height than that of a first sealant portion are temporarily formed outside the first sealant portion, so that a smooth transitional support surface is formed between the first sealant portion, the second sealant portion, the third sealant portion and a support column inside the panel.

12 Claims, 3 Drawing Sheets

LIQUID CRYSTAL DISPLAY PANELS AND METHODS OF MANUFACTURING THE SAME

CROSS-REFERENCE TO RELATED APPLICATION

This application claims priority to and the benefit of Chinese Patent Application No. 202310097070.2, filed on Feb. 10, 2023, the disclosure of which is incorporated herein by reference in its entirety.

TECHNICAL FIELD

The present disclosure relates to the field of display panel manufacturing, and in particular, to methods of manufacturing a liquid crystal display panel and liquid crystal display panels manufactured thereby.

BACKGROUND

In a liquid crystal display (LCD) panel, due to the existence of a sealant portion in a frame area, height difference between an upper color filter substrate and a lower array substrate may exceed cell gap in a display area. A difference in cell gap may lead to a difference in liquid crystal deflection during driving, which may in turn lead to deviation in display uniformity of the panel and whitening of the peripheral frame due to light leakage. Especially, in a product that is designed to cover a photo spacer (PS) in order to prevent a gate driver on array (GOA) circuit from being short-circuited, heights of the sealant portion and the PS in the frame area may be accumulated so that the height difference is greater and the whitening of the frame is more obvious.

As mentioned above, in the LCD panel of the related art, the height of the sealant portion in the frame area may be greater than cell gap in the display area. This may result in obvious height difference in the transition area that may result in poor flatness of the upper and lower substrates and poor sealing of the panel, which may in turn affect the liquid crystal deflection and lead to bad phenomenon of whitening of the frame. This phenomenon needs to be addressed in the process of manufacturing the panel.

SUMMARY

In view of the above, an embodiment of the present disclosure provides a method of manufacturing a liquid crystal display panel, which comprises:

providing an upper cover plate defining at least one daughter board area and a cutting area located outside the daughter board area on the upper cover plate;

arranging a first sealant portion at an edge of the daughter board area close to the cutting area;

arranging a second sealant portion and a third sealant portion in the cutting area, wherein a long side of each of the second sealant portion and the third sealant portion is in a same direction as the edge of the daughter board area;

arranging a lower substrate on an opposite side of the upper cover plate; the lower substrate covering at least the daughter board area and the cutting area located outside the daughter board area; and forming a motherboard, cutting and removing film layers in the cutting area to form at least one daughter board independent from each other.

An embodiment of the present disclosure further provides a liquid crystal display panel manufactured by the above method, the panel comprising:

a lower substrate;

an upper cover plate arranged opposite to the lower substrate; and, a liquid crystal layer arranged between the lower substrate and the upper cover plate; wherein a deformation height difference of the upper cover plate is less than 0.6 mm.

DETAILED DESCRIPTION

Figure 1:
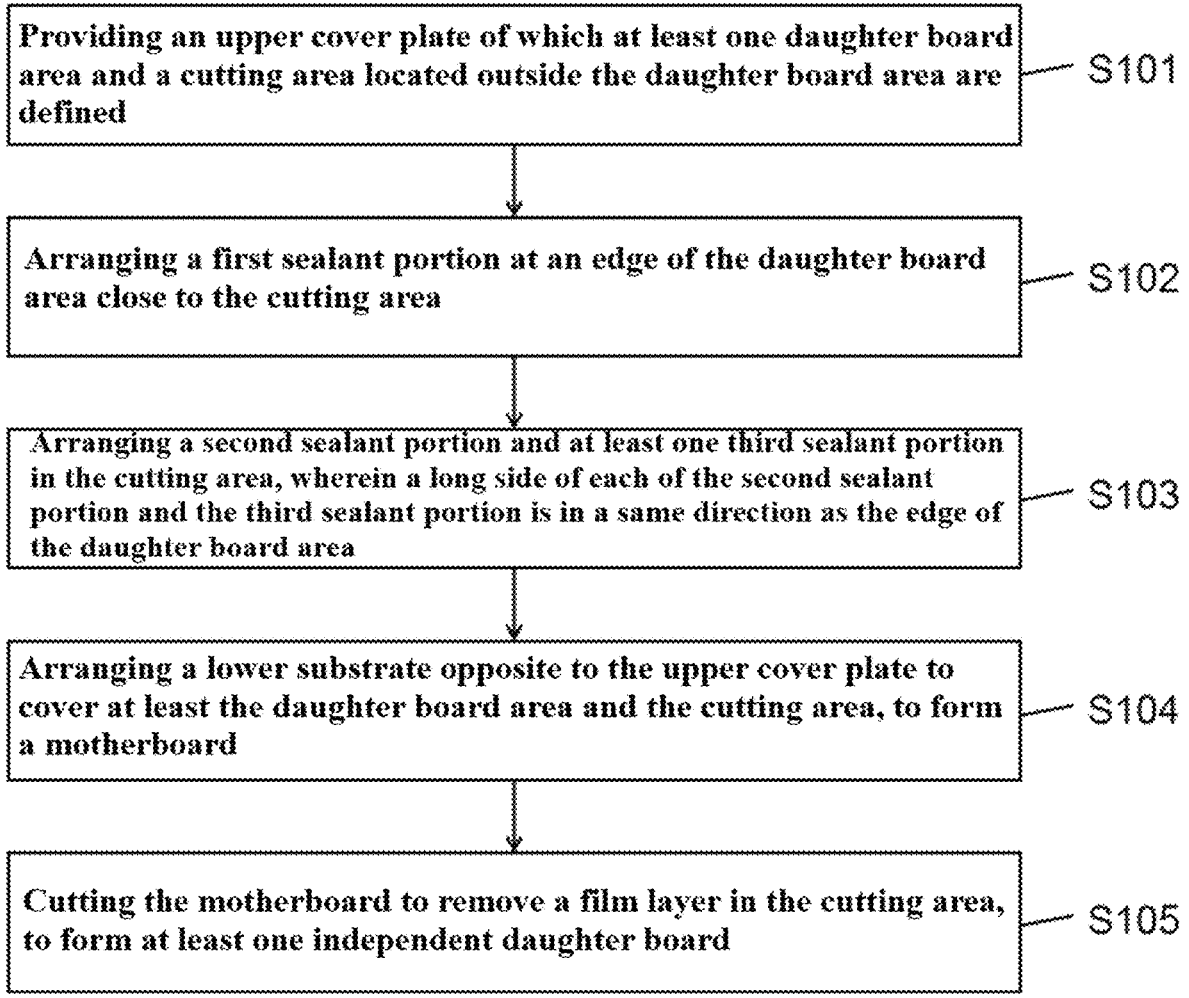
FIG. 1 is a schematic flowchart of a method of manufacturing a liquid crystal display panel according to an embodiment of the present disclosure.

The following description of various embodiments is provided with reference to the accompanying drawings to illustrate specific embodiments that can be practiced in the present disclosure. Directions terms mentioned in the present disclosure, for example, [upper], [lower], [front], [back], [left], [right], [inner], [outer], [side], and the like, are only directions referring to the accompanying drawing. Therefore, the directional terms are used to explain and understand the present disclosure, not to limit the present disclosure. In the drawings, units with similar structures are denoted by the same reference numerals.

The terms "first", "second" are used for descriptive purposes only and cannot be understood as indicating or implying relative importance or implicitly indicating the number of indicated technical features. Therefore, the features defined as "first" and "second" may include one or more of these features explicitly or implicitly. In description of the present disclosure, "a plurality of" means two or more, unless otherwise specified.

Some embodiments of the present disclosure will be described in detail with reference to the accompanying drawings.

As mentioned above in the background, in a liquid crystal display panel, due to the existence of sealant portion in frame area, height difference between an upper substrate and a lower substrate may exceed cell gap in the display area, which leads to a difference in liquid crystal deflection during driving and in turn causes deviation in display uniformity of the panel and whitening of the peripheral frame due to light leakage. This may deteriorate display effect and comprehensive performance of the display panel.

As shown in FIG. 1, a method of manufacturing a liquid crystal display panel according to an embodiment of the present disclosure may comprise the following steps:

S101: providing an upper cover plate defining at least one daughter board area and a cutting area located outside the daughter board area on the upper cover plate;

S102: arranging a first sealant portion at an edge of the daughter board area close to the cutting area;

S103: arranging a second sealant portion and a third sealant portion in the cutting area, wherein a long side direction of the second sealant portion and the third sealant portion is the same as an edge direction of the adjacent daughter board area;

S104: arranging a lower substrate opposite to the upper cover plate to cover at least the daughter board area and the cutting area, to form a motherboard; and S105: cutting the motherboard to remove the cutting area, to form at least one independent daughter board.

The third sealant portion is conductive and, upon being powered on, is cut off together with the second sealant portion During the process of manufacturing and foring a liquid crystal display panel, in order to simplify the manufacturing process and improve the production efficiency of the liquid crystal display panel, each film layer is usually first formed directly on a large-size substrate, each different film layer is correspondingly arranged in different areas, and each area is finally cut to obtain a panel with a required size.

Figure 2:
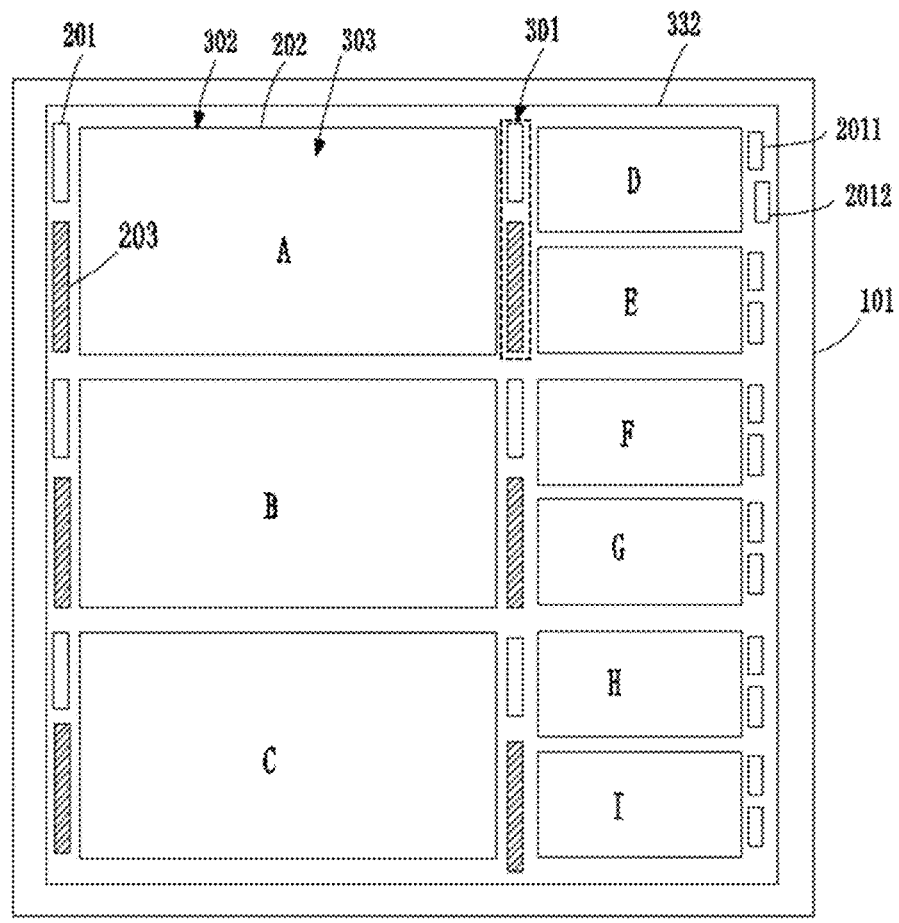
FIG. 2 is a schematic plan view of a motherboard according to an embodiment of the present disclosure.

Referring to a structure of a motherboard according to an embodiment of the present disclosure as shown in FIG. 2, the upper cover plate 101 may include a plurality of different areas. The plurality of different areas may be arranged according to the requirements of different products, for example, the entire upper cover plate 101 can be divided into a plurality of different areas, and one or more daughter board areas may be correspondingly aranged in each area. The daughter board areas may be arranged in an array along the row and column directions of the upper cover plate, or may be arranged according to sizes and specifications of different panels, which will not be described in detail herein.

In the following embodiments, for actual products, the upper cover plate 101 is described with a size of 1000 mm in both length and width. In this size, the upper cover plate 101 can be divided into a plurality of different daughter board areas, such as daughter board area A, daughter board area B, daughter board area C, and daughter board area D to daughter board area I.

In an embodiment of the present disclosure, the daughter board areas may be arranged to have the same size, or may be arranged to have different sizes. Specifically, daughter board area A, daughter board area B and daughter board area C has the same size such as S1. The six daughter board areas D to I are arranged to have the same size such as S2. In embodiments of the present disclosure, the area S1>S2 is taken as an example for description.

Optionally, daughter board area A, daughter board area B, and daughter board area C are arranged in the same column. Meanwhile, daughter board area D to daughter board area I are arranged in the same column, and are arranged on the same side of daughter board area A, thus finally forms the structure provided in embodiments of the present disclosure.

Further, daughter board area A may have an area of larger than a sum of areas of daughter board area D and daughter board area E, and a straight-line distance between daughter board area A and a side of daughter board area D close to daughter board area A is equal to that between and daughter board area A and a side of daughter board area E. Meanwhile, the upper cover plate is further provided with a motherboard glue, which is arranged around all the defined daughter board areas.

In embodiments of the present disclosure, a cutting area 301 is further provided outside each daughter board area. Meanwhile, each of the daughter board areas includes a display area 303, and a frame area 302 arranged around the display area 303, wherein the frame area 302 may be correspondingly arranged at an edge position of each daughter board area. A first sealant portion 202 is further provided in the frame area 302, and is arranged around the display area 303, so that two different substrates are combined to form a panel.

Meanwhile, a second sealant portion 203 is provided in each daughter board area. In embodiments of the present disclosure, the second sealant portion 203 is correspondingly arranged in the cutting area 301 of each daughter board area. Further, a spacing between the second sealant portion 203 and the first sealant portion 202 is set to be 5 mm~15 mm, for example, 5 mm, 8 mm, 10 mm, or 15 mm. Optionally, the spacing can be set according to different products, which will not be described in detail herein.

In embodiments of the present disclosure, the first sealant portion 202 and the second sealant portion 203 are arranged firstly, then the third sealant portion 201 is arranged in each daughter board area. Specifically, the third sealant portion 201 can be correspondingly arranged in the cutting area 301 of each daughter board area. Meanwhile, the third sealant portion 201 can be arranged at different positions of the cutting area 301. In embodiments of the present disclosure, the third sealant portion 201 is mainly a conductive sealant portion, and the third sealant portion 201 is arranged in a strip structure. Conductive particles, such as conductive carbon nanomaterials or conductive metal materials, such as metal copper, are provided in the third sealant portion 201, so as to achieve the conductive function.

Meanwhile, the third sealant portion 201 can be arranged at at least one side of each daughter board area. When it is necessary to align liquid crystal molecules in the daughter board area, a current or a voltage is applied to the third sealant portion, and the third sealant portion 201 forms an electric field in each daughter board area, so that the liquid crystal molecules in the liquid crystal cell are deflected to a certain extent, and alignment function is realized.

Further, during the arrangement of the second sealant portion 203 and the third sealant portion 201, as shown in FIG. 2, the second sealant portion 203 and the third sealant portion 201 are arranged on the same straight line, and both the second sealant portion 203 and the third sealant portion 201 are parallel to one side of the first sealant portion 202, for example, parallel to one side of the first sealant portion 202 adjacent to the second sealant portion 203. In embodiments of the present disclosure, when the second sealant portion 203 and the third sealant portion 201 are arranged on the same straight line, a gap is rranged between the second sealant portion 203 and the third sealant portion 201, and a length of the gap may be set as from 4 mm to 18 mm. Optionally, the length of the gap is set as 7 mm, 10 mm, or as desired.

Figure 3:
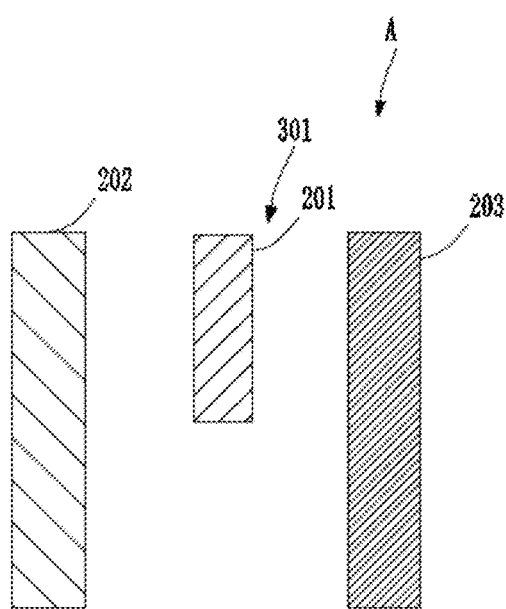
FIG. 3 is a schematic plan view of another arrangement of sealant portions according to an embodiment of the present disclosure.

Further, referring to another arrangement of sealant portions according to an embodiment of the present disclosure as shown in FIG. 3, arrangement structure of sealant portions on the left side of the daughter board area A is taken as an example for description. Both the second sealant portion 203 and the third sealant portion 201 are arranged on one side of the first sealant portion 202, and are correspondingly arranged in the cutting area 301. The third sealant portion 201 may has a length smaller than that of the second sealant portion 203, so that the second sealant portion 203 may be provided with a longer length. When the daughter board area A is cut in the cutting area, the second sealant portion 203 may support the substrate in a larger range, thus preventing the substrate from being deformed during the cutting process, and resulting in a light leakage in the frame area due to deformation.

At this time, the third sealant portion 201 is arranged on a side close to the first sealant portion 202, and the spacing distance between the third sealant portion 201 and the second sealant portion 203 is set to be from 5 mm to 15 mm, for example, 10 mm or 14 mm, thereby preventing light leakage caused by severe deformation at the frame area during cutting.

Further, in order to prevent deformation during cutting, the third sealant portion 201 can be further arranged on a perpendicular bisector between the first sealant portion 202 and the second sealant portion 203, thereby ensuring good supporting force on both sides to prevent deformation during cutting.

Figure 4:
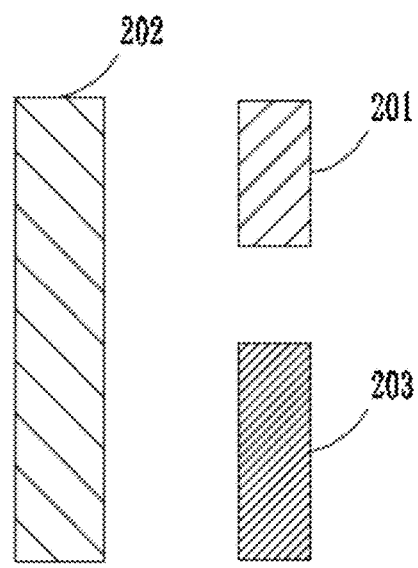
FIG. 4 is a schematic plan view of further another arrangement of sealant portions according to an embodiment of the present disclosure.

Referring to further another arrangement of sealant portions according to an embodiment of the present disclosure as shown in FIG. 4 as compared with the structure in FIG. 3, the relative location relationship between the second sealant portion 203 and the third sealant portion 201 can be changed, for example, the second sealant portion 203 and the third sealant portion 201 can be arranged on the same vertical line. In addition, both the second sealant portion 203 and the third sealant portion 201 are arranged in parallel with the first sealant portion 202, so that area of the cutting area can be further shortened, thereby maximizing the utilization of the upper cover plate and reducing production cost of the display panel. Meanwhile, the height of the first sealant portion is greater than that of the second sealant portion.

Further, when the second sealant portion 203 and the third sealant portion 201 are arranged according to the position shown in FIG. 4, the width of the second sealant portion 203 may be the same as that of the third sealant portion 201, and the width of the second sealant portion 203 and the width of the third sealant portion 201 may be smaller than that of the first sealant portion 202, thereby ensuring packaging effect of the first sealant portion 202 and ensuring supporting performance of the second sealant portion 203.

Further, in an embodiment of the present disclosure, referring to the arrangement structure in FIG. 2, the third sealant portion 201 and the second sealant portion 203 may be arranged in a plurality. For daughter board area A, there may be two third sealant portions 201 arranging on both the left and right sides of the daughter board area A respectively, and two pieces of the third sealant portions parallel to each other may be arranged at a right edge of the daughter board area D at the corresponding position of the daughter board area D with a smaller area. For example, the third sealant portion 201 includes a third sub-sealant portion 2011 and a fourth sub-sealant portion 2012. Straight-line distance between the third sub-sealant portion 2011 and the second sealant portion 203 is different from that between the fourth sub-sealant portion 2012 and the second sealant portion 203. In this way, when the daughter board area D is cut in the cutting area, the two sub-sealant portions can supporting different cutting areas since they are arranged at different positions respectively, thus ensuring the supporting effect.

Meanwhile, for the third sealant portion 201 between the daughter board area A and the daughter board area D, the length of the third sealant portion 201 may be greater than that of the third sub-sealant portion 201 or the fourth sub-sealant portion 2012. Meanwhile, and the third sealant portion 201 and the second sealant portion 203 are arranged at at 1/2 of a distance between the daughter board area A and the daughter board area D, so that the second sealant portion 203 and the third sealant portion 201 can simultaneously support the daughter boards on both sides and prevent large deformation at the edges.

Further, in embodiments of the present disclosure, after arrangement of each sealant portion on the upper cover plate is completed, a lower substrate is arranged on the upper cover plate to form a panel. In embodiments of the present disclosure, the above lower substrate is provided with a corresponding color resistance structure and different functional film layers, such as a buffer layer, an array substrate, an alignment layer and the like, and a driving functional layer is formed to ensure normal operation of the liquid crystal display panel, wherein the specific functional film layers are not specifically shown in FIG. 2. Meanwhile, after arrangement of the upper cover plate and the lower substrate is completed, the entire upper cover plate is cut in the cutting area, wherein the cutting line is close to an edge position of each daughter board area, thereby obtaining 1 liquid crystal display panel with narrow-frame.

Figure 5:
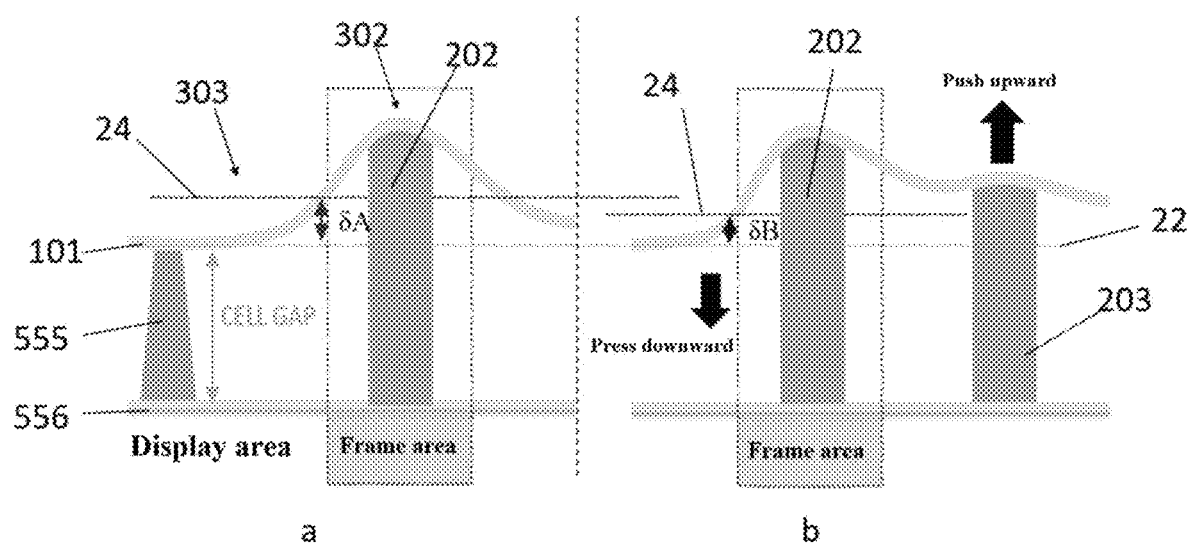
FIG. 5 is a schematic diagram showing comparison of respective effects when cutting a liquid crystal display panel in the related art and in an embodiment of the present disclosure.

FIG. 5 shows comparison of respective effects when cutting the liquid crystal display panel in the related art and in an embodiment of the present disclosure. Specifically, FIG. 5 (a) shows that in the related art, the upper cover plate 101 and the lower substrate 556 are combined to form a panel through a support column 555 and the first sealant portion 202, wherein the support column 555 is correspondingly arranged in the display area 303, and the first sealant portion 202 is arranged in the frame area 302. After the film layers such as the upper cover plate and the lower substrate 556 are arranged, large-sized substrate needs to be cut, for example, the cutting area 301 outside the frame area needs to be cut. A cutting force is applied to the substrate during cutting, and it will cause deformation of the substrate. Meanwhile, since the heights of the support column 555 and the first sealant portion 202 are different, a seesaw structure will be formed in the panel, which will further causes deformation such as warping after cutting, as can be seen from the standard height line 22 and the deformation height line 24 in FIG. 5. The standard height line 22 is a position where the deformation is not caused after cutting in an ideal state, and the deformation height line is a position where deformation is caused actually after cutting.

In the related art, after the panel is cut, the height of the deformation height line 24 is H1, and the height of the standard height line 22 is H. At this time, the deformation height difference between them is $\delta A = H1 - H$. In the related art, the deformation height difference $\delta A$ is generally greater than 0.7 mm. In contrast, in an embodiment of the present disclosure, referring to FIG. 5(b) showing deformation effect when cutting the panel, a second sealant portion 203 is further arranged outside the frame area 302 of the display panel, and the height of the second sealant portion 203 can be smaller than that of the first sealant portion 202.

Under this structure, the panel is cut, wherein the cutting line is located between the first sealant portion 202 and the second sealant portion 203. At this time, since the first sealant portion 202 is arranged on the left side of the cutting line, and the second sealant portion 203 is arranged on the right side of the cutting line, a new seesaw structure is formed among the support column 555, the first sealant portion 202, and the second sealant portion 203. The second sealant portion 203 can effectively support and push upward the lower substrate or the upper cover plate on the right side of the cutting line, thus reducing the deformation degree of each substrate during the cutting process. Specifically, the height of the standard height line 22 is H, and the height of the corresponding deformation height line 24 after deformation is H3. In embodiments of the present disclosure, when defining the above-mentioned height and the corresponding deformation height line, the plane in the display area corresponding to the lower substrate 556 is taken as a reference, and the plane in this display area may be regarded as not being deformed after cutting. Therefore, this plane corresponding to this display area is the bottom plane. Specifically, for example, after the cutting is completed, the upper cover plate 101 is at an edge position, and the plane corresponding to a position, where the maximum deformation of the upper surface or the lower surface of the upper cover plate 101 occurs, corresponds to the deformation height line 24. Meanwhile, the height between this plane and the bottom plane corresponding to the lower substrate 556 is the specific value of the deformation height line. Similarly, the plane corresponding to the upper cover plate 101 after cutting without deformation is the plane corresponding to the standard height line 22. In embodiments of the present disclosure, the standard height line 22 can be understood as the height value of the liquid crystal cell between the upper cover plate 101 and the lower substrate 556. The parameter values are measured. In embodiments of the present disclosure, the height H of the standard height line ranges from 3.3 mm to 3.4 mm, and the height H3 of the deformation height line ranges from 3.8 mm to 4 mm after cutting is completed.

At this time, the deformation height difference between them is δB=H3−H. Specifically, the deformation height difference δB is less than 0.6 mm, which is less than the deformation height difference in the related art. Thus, it can be seen that the deformation height difference is effectively reduced, and the parallelism between the two different film layers of the upper cover plate and the lower substrate at the edge area is ensured. In embodiments of the present disclosure, there is a parallelism between the upper cover plate 101 and the lower substrate 556. This parallelism is the deformation height difference between the upper cover plate 101 and the lower substrate 556.

In embodiments of the present disclosure, since the second sealant portion 203 is arranged, the height corresponding to the deformation height line is smaller than that in the related art. Therefore, the deformation height difference δB in embodiments of the present disclosure is less than the value of δA. Therefore, in embodiments of the present disclosure, after cutting is completed, the deformation of the panel in the cutting area around the panel is smaller, thereby effectively improving the flatness of the entire area after the panel is cut, and preventing the panel from light leakage and the like in the frame area.

Further, embodiment of the present disclosure also provides liquid crystal display panels, which are manufactured and formed through the above manufacturing process and method. The peripheral edge of the liquid crystal display panel has a better flatness, thereby effectively preventing the problem of light leakage caused by easy deformation of the peripheral edge of the panel in the process of manufacturing the panel, and improving the comprehensive performance of the liquid crystal display panel.

In embodiments of the present disclosure, the liquid crystal display panel and the corresponding display device may be any product or component with display function, touch control function, or the like, such as a mobile phone, a computer, an electronic paper, a display, or the like, and the specific type thereof is not specifically limited.

Embodiments of the present disclosure provide methods of manufacturing a liquid crystal display panel and the liquid crystal display panels. In the process of forming motherboard of the display panel, a second sealant portion and a third sealant portion with a lower height than that of the first sealant portion are temporarily formed outside the sealant portion, the height of the third sealant portion is less than that of the first sealant portion, and the third sealant portion is arranged outside the first sealant portion. In this way, a smooth transition support surface is formed among the first sealant portion, the third sealant portion and PS inside the panel. When the panel is cut, the smooth transition support surface can repair the flatness of the lower substrate in the light leakage area of the liquid crystal display panel, thereby improving the light leakage defect, and effectively improving the uniformity of the display effect of the liquid crystal display panel.

In view of the foregoing, methods of manufacturing a liquid crystal display panel and the liquid crystal display panels provided in embodiments of the present disclosure have been described in detail above, and the principles and embodiments of the present disclosure are described by using specific examples herein. Descriptions of the above embodiments are merely intended to help understand the methods and core ideas of the present disclosure, but not intended to limit the present disclosure. Those skilled in the art can make various changes or modifications without departing from the present disclosure. Therefore, the scope of protection of the present disclosure is defined by the claims.

What is claimed is:

1. A method of manufacturing a liquid crystal display panel, comprising:
    providing an upper cover plate of which at least one daughter board area and a cutting area located outside the daughter board area are defined;
    arranging a first sealant portion at an edge of the daughter board area close to the cutting area;
    arranging a second sealant portion and at least one third sealant portion in the cutting area, wherein a long side of each of the second sealant portion and the third sealant portion is in a same direction as the edge of the daughter board area;
    arranging a lower substrate opposite to the upper cover plate to cover at least the daughter board area and the cutting area, to form a motherboard; and
    cutting the motherboard to remove the cutting area, to form at least one independent daughter board;
    wherein the third sealant portion is arranged between the first sealant portion and the second sealant portion and on a perpendicular bisector between the first sealant portion and the second sealant portion, and a height of the first sealant portion is greater than that of the second sealant portion.

2. The method according to claim 1, wherein the third sealant portion is conductive and, upon being powered on, is cut off together with the second sealant portion.

3. The method according to claim 1, wherein the at least one third sealant portion comprises a plurality of third sealant portions respectively having a plurality of straight-line distances from the second sealant portion, the plurality of straight-line distances being not equal to each other.

4. The method according to claim 2, wherein
    the at least one daughter board area comprises at least a first daughter board area, and a second daughter board area and a third daughter board area close to a short side of the first daughter board area, the first daughter board area is larger than a sum of the second daughter board area and the third daughter board area, and a side of each of the second daughter board area and the third daughter board area close to the first daughter board area has an equal straight-line distance from the first daughter board area; and the third sealant portion is arranged, close to the first daughter board area, at 1/2 of a distance between the first daughter board area and the second daughter board area.

5. The method according to claim 1, wherein motherboard glue is arranged on the upper cover plate to surround all the at least one daughter board area.

6. A method of manufacturing a liquid crystal display panel, comprising:

providing an upper cover plate of which at least one daughter board area and a cutting area located outside the daughter board area are defined;

arranging a first sealant portion at an edge of the daughter board area close to the cutting area;

arranging a second sealant portion and at least one third sealant portion in the cutting area, wherein a long side of each of the second sealant portion and the third sealant portion is in a same direction as the edge of the daughter board area;

arranging a lower substrate opposite to the upper cover plate to cover at least the daughter board area and the cutting area, to form a motherboard; and cutting the motherboard to remove the cutting area, to form at least one independent daughter board;

wherein the third sealant portion is conductive and, upon being powered on, is cut off together with the second sealant portion;

wherein the at least one daughter board area comprises at least a first daughter board area, and a second daughter board area and a third daughter board area close to a short side of the first daughter board area, the first daughter board area is larger than a sum of the second daughter board area and the third daughter board area, and a side of each of the second daughter board area and the third daughter board area close to the first daughter board area has an equal straight-line distance from the first daughter board area; and wherein the third sealant portion is arranged, close to the first daughter board area, at 1/2 of a distance between the first daughter board area and the second daughter board area.

7. The method according to claim 6, wherein the third sealant portion is arranged between the first sealant portion and the second sealant portion and on a perpendicular bisector between the first sealant portion and the second sealant portion, and a height of the first sealant portion is greater than that of the second sealant portion.

8. The method according to claim 6, wherein the third sealant portion and the second sealant portion are arranged on a same straight line, and both the second sealant portion and the third sealant portion are parallel to an edge line of the cutting area.

9. The method according to claim 8, wherein there is a gap between the second sealant portion and the third sealant portion, and a length of the gap is set to 4 mm~18 mm.

10. The method according to claim 8, wherein the third sealant portion is in contact with the second sealant portion, and conductive particles are added into the third sealant portion.

11. The method according to claim 6, wherein the at least one third sealant portion comprises a plurality of third sealant portions respectively having a plurality of straight-line distances from the second sealant portion, the plurality of straight-line distances being not equal to each other.

12. The method according to claim 6, wherein motherboard glue is arranged on the upper cover plate to surround all the at least one daughter board area.

* * * * *